F. C. BENNETT.
CUTTING BOARD.
APPLICATION FILED FEB. 8, 1918.
1,307,844.
Patented June 24, 1919.
2 SHEETS—SHEET 1.
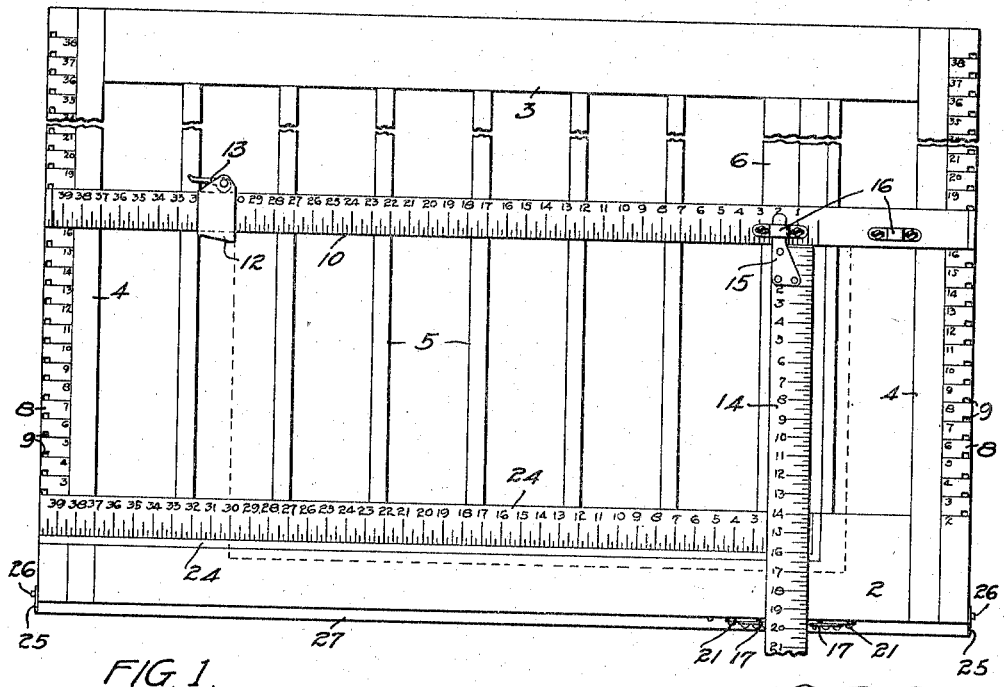
INVENTOR
FRANK C. BENNETT

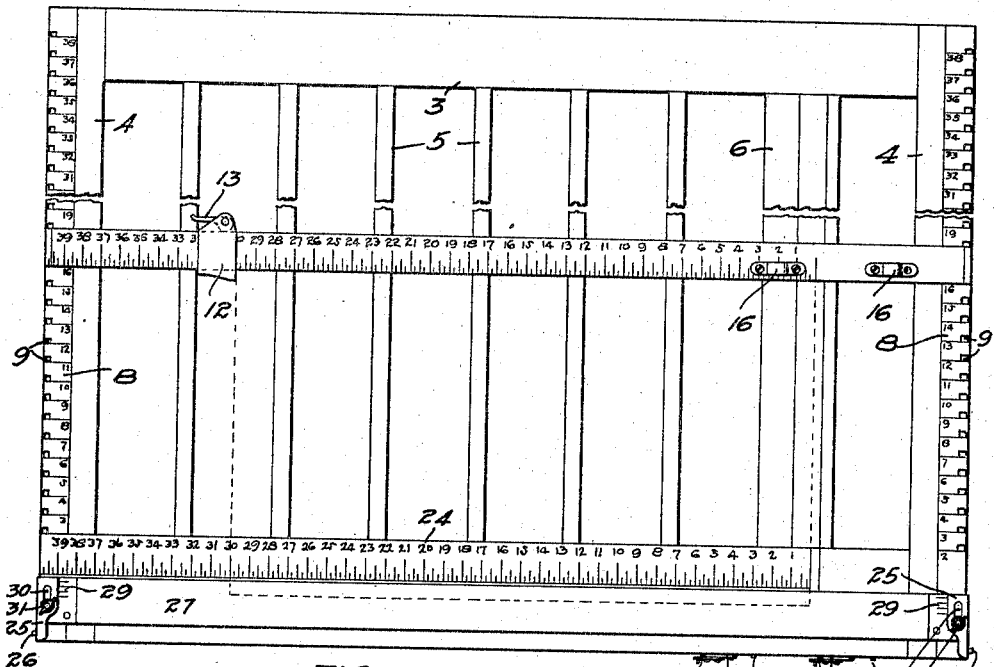

UNITED STATES PATENT OFFICE.

FRANK C. BENNETT, OF JAMESTOWN, NORTH DAKOTA.

CUTTING-BOARD.

1,307,844. Specification of Letters Patent. Patented June 24, 1919.

Application filed February 8, 1918. Serial No. 216,069.

*To all whom it may concern:*

Be it known that I, FRANK C. BENNETT, a citizen of the United States, resident of Jamestown, county of Stutsman, State of North Dakota, have invented certain new and useful Improvements in Cutting-Boards, of which the following is a specification.

The object of my invention is to provide an improved board for cutting glass, paper and the like to the end that the work can be neatly and expeditiously performed and in cutting glass there will be no danger of breakage resulting from small pieces of glass getting between the board and the sheet that is being cut.

A further object is to provide a board having means by which the desired dimensions of the sheet or plate to be cut can be easily and quickly determined.

Other objects of the invention will appear from the following detailed description.

The invention consists generally in various constructions and combinations, all as hereinafter described and particularly pointed out in the claims.

In the accompanying drawings forming part of this specification,

Figure 1 is a plan view of a cutting board embodying my invention,

Fig. 2 is a detail plan view of a portion of one end of the board,

Fig. 3 is an edge view, showing the means for holding one end of a cutter guiding bar in position, Fig. 4 is a sectional view on the line 4—4 of Fig. 2, Fig. 5 is a plan view, showing the hinged bar of the board raised to a position for guiding the glass cutter or knife.

Fig. 6 is a detail view of one end of this bar, showing the adjustment thereof,

Fig. 7 is a sectional view on the line 7—7 of Fig. 6,

Fig. 8 is a detail view, partially broken away, showing the manner of mounting the graduated bar on the board against which the sheet or plate to be cut is seated, Fig. 9 is a sectional view on the line 9—9 of Fig. 8, Fig. 10 is a sectional view on the line 10—10 of Fig. 8.

In the drawing, 2 and 3 represent the side rails of the board and 4 the end rails mounted to form a substantially rectangular frame of suitable size. Between the rails 2 and 3 in parallel relation I provide a series of supporting cross bars 5, suitably spaced apart to form a skeleton middle portion to the board and prevent the accumulation of pieces of glass and other foreign matter, which, if the board were solid, might accidentally collect between the glass and the board and cause a pressure on the glass sufficient to crack it during the cutting operation. Near one of the bars 4, preferably at the right end of the frame, I provide a bar 6 which I prefer to designate as the cutting bar and made preferably of zinc to form a cutting surface or backing for the glass cutter or the knife when the board is used for cutting paper. The end rails 4 are preferably rabbeted, as at 7, and angle bars 8 are fitted over these rabbeted edges with the upper flanges of the bars seated within recesses provided in the top of the rails 4, so that the upper surfaces of the angle bars will be flush substantially with the top of the rails and in fact, this is the construction of the entire board, no projections or raised portions being formed thereon which would in any way interfere with the cutting operation or produce an undue pressure on the glass. These upper flanges have graduations thereon beginning preferably at a point two inches from the ends of the rails at the front of the board, as shown plainly in Fig. 1. From this point the graduations in inches preferably continue to the other side of the board.

The angle bars are also provided with notches 9 therein communicating with the recesses formed by the rabbets beneath. A bar 10 having its upper surface provided with graduations in inches and fractions thereof is adjustable on the rails 4 and has depending lugs 11 which fit into the notches 9 and hold the bar in place on the rails. The forward edge of this bar serves as a seat for the plate of glass or paper to be cut and by adjusting it back and forth on the rails 4, the operator may adapt the board for cutting the glass to any desired dimensions.

A block 12 is preferably mounted on the bar 10, secured by a cam lever 13 which, when loosened, allows the block to be adjusted back and forth on the bar and seated against the end of the sheet of glass that is being cut while the opposite end rests upon the zinc cutting bar 6.

To guide the cutting tool while the end of the sheet is being cut, I provide a bar 14 having a finger 15 at one end for insertion into a loop 16 provided on the bar 10 above the zinc cutting bar. This loop, as shown in Fig. 4, is of sufficient depth to allow the finger 15 therein to have freedom of vertical movement and permit adjustment of the bar 14 to varying thicknesses of the sheet of glass or to several sheets which may be placed on the board, and the loop also has a pin and slot connection 16′ with the bar 10 for longitudinal adjustment thereon, so that the edge of the bar 14 can be properly adjusted with respect to the graduations on the bar 10 to compensate for the thickness of the glass cutting tool.

The bar 14 extends over the rail 2 and a clip 17 has a seat 18 thereon to receive the edge of the bar and is adjustable by means of a slot 19 and screws 20 on a plate 21 that is pivoted at 22 to the forward edge of the rail 2. Pins 23 are mounted in the edge of the rail to form rests for the plate 21 when it is in use or when it is turned down below the surface of the rail, as indicated by dotted lines in Fig. 3. There are preferably two of these clips on the rail, as indicated in Fig. 1, opposite each loop 16 on the bar 10.

The rail 2 is also recessed to receive the bar 24, suitably graduated and preferably of zinc to form a cutting surface for the paper, and angle plates 25 are pivoted at 26 on the angle bars 8 and are fitted to the end of a bar 27 which is adapted to swing around the forward edge of the rail 2 and rest upon the glass and form a cutting edge or guide for the glass cutter, as indicated by solid lines in Figs. 5 and 7 or it may be swung to a dotted line inoperative position, as indicated in said figure to provide room for the plate of glass. Under the bar 27 I provide slots 28 in the angle plates 25 to receive the pins 26 and allow a vertical movement of the angle plates and the bar 27 to accommodate them to the varying thicknesses of the sheets of glass to be cut. The bar 27 is also graduated at 29 transversely and the angle plates have slots 30 therein and thumb nuts 31 for the adjustment of the bar 27 edgewise back and forth over the zinc cutting bar beneath.

It will be noted that the cutting surfaces, preferably of zinc as heretofore described, come together or merge at one corner, preferably the lower right hand corner of the board, so that the cutting will all be performed in the same plane regardless of the size of the sheet on which the cutting tool is working.

In the operation of the board, the bars are set for the desired dimensions of the sheet of glass or other article to be cut. The cutter is then run along the edge of the bar 14 to score the glass at that point. The bar 14 is then removed and the bar 27 swung from its normal inoperative position below the board to the point indicated by full lines in Figs. 5 and 7, where it will form a straight or guiding edge for the cutter to score the longitudinal edge of the glass. When the glass has been properly scored the edges are broken off and a sheet of the desired dimension obtained. By the relative adjustment to the graduated bars the sheet may be cut to any desired size.

I claim as my invention—

1. A cutting board comprising side and end rails and cross bars between them forming supports for a sheet of glass to be cut, one of said cross bars having a surface on which the cutting operation is performed, said end rails having graduations thereon, a bar having an adjustable connection with said end rails over said graduations and against which the sheet to be cut is seated, and a guide for the cutter mounted over said cutting surface bar and having means for mounting one end on said adjustable bar.

2. A cutting board comprising side and end rails and cross bars between them forming supports for a sheet of glass to be cut, one of said cross bars having a surface on which the cutting operation is performed, said end rails having graduations thereon, a bar adjustable over said graduations and against which the sheet to be cut is seated, a guide for a cutter mounted over said cutting surface bar transversely of said adjustable bar, and seats for said transverse bar on said adjustable bar and one of said side rails.

3. A cutting board comprising side and end rails and cross bars between them spaced apart and having comparatively narrow upper surfaces forming supports for a sheet of glass thereon, the openings between said bars allowing small pieces of glass and other foreign material to drop between said cross bars, a bar having an adjustable connection with said end rails and against which the sheet to be cut is seated, and a guide having seats on said adjustable bar and one of said side rails.

4. A cutting board comprising side and end rails, the latter having graduations thereon and provided with a series of notches at regular intervals, a graduated bar adjustable transversely of said frame in said notches and forming a seat for the sheet of glass on said board, and a second bar mounted on said first named bar at right angles thereto and forming a guide for a cutting tool, said second bar having means for mounting it on said first named bar.

5. A cutting board comprising side and end rails, the latter having outer rabbeted edges and angle plates fitting thereon and having graduated upper surfaces and notches therein leading to said rabbets, a graduated bar having lugs to enter said notches and adjustable therein lengthwise of said end rails, and a second graduated bar mounted transversely of said first named bar and adjustable thereon and forming a guide for a cutting tool.

6. A cutting board comprising side and end rails, a cross bar adjacent one of said end rails and forming a cutting surface, said end rails having graduations thereon, a graduated bar adjustable over said end rails and a second graduated bar mounted over said cross bar and forming a guide for a cutting tool, said second graduated bar having one end seated in said first named bar and its other end seated on one of said side rails.

7. A cutting board having a surface to receive a sheet to be cut and graduated bars for determining the proper dimensions of the sheet and a bar hinged in said board and adapted to be swung from a position below the level of the board to a point overhanging the edge of the sheet thereon, and vertically adjustable to adapt it for sheets having different thicknesses, the edge of said bar performing a guide for a cutting tool.

8. The combination, with a cutting board, of a bar pivoted thereon and normally swung to an inoperative position below the level of the board and adapted to be swung to a position above the board to rest upon the sheet to be cut and form a guide for a cutting tool and adjustable vertically with respect to the board to adapt it for sheets having different thicknesses.

9. The combination, with a cutting board, of angle plates pivoted on the ends of said board and adapted to swing from a position below the board to a point above the same and a bar adjustably mounted in said angle plates and adapted to rest on the sheet to be cut and form a guide for the cutting tool.

10. The combination, with a cutting board, of plates pivoted thereon near one edge and having freedom of vertical movement on their pivots, and a bar mounted in said plates and adapted to rest upon the sheet to be cut and form a guide for a cutting tool thereon, the vertical movement of said plates on their pivots allowing the adjustment of said bar to varying thicknesses of sheets.

11. A cutting board comprising side and end rails, the front side rail and said end rails having graduated plates seated therein with their upper surfaces flush substantially with the surfaces of said rails, a graduated cross bar mounted for adjustment on said end rails and against which the edge of the sheet to be cut is seated, and a second bar mounted transversely of said first named bar and forming a guide for a cutting tool and having one end seated in said cross bar and its opposite end seated on one of said side rails.

12. A cutting board comprising side and end rails and cross bars between them, one of said cross bars having a surface on which the cutting operation is performed, said end rails having graduations thereon, a bar adjustable over said graduations and against which the sheet to be cut is seated, a guide for a cutting tool mounted over said cutting surface cross bar and seated on said adjustable bar and one of said side rails, said guide having a limited upward movement in its seats to adapt it for sheets of different thickness.

In witness whereof, I have hereunto set my hand this 18th day of January, 1918.

FRANK C. BENNETT.

Copies of this patent may be obtained for five cents each, by addressing the "Commissioner of Patents, Washington, D. C."